(12) United States Patent
Morgan, III

(10) Patent No.: US 6,275,235 B1
(45) Date of Patent: Aug. 14, 2001

(54) HIGH PRECISION TEXTURE WRAPPING METHOD AND DEVICE

(75) Inventor: David L. Morgan, III, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/217,398

(22) Filed: Dec. 21, 1998

(51) Int. Cl.⁷ .................................................... G06F 15/00
(52) U.S. Cl. ........................ 345/430; 345/429; 345/431; 345/432; 345/433
(58) Field of Search ................................ 345/430, 426, 345/422, 441, 421, 423, 431, 432

(56) References Cited

U.S. PATENT DOCUMENTS

| | | | |
|---|---|---|---|
| 5,361,386 | * 11/1994 | Watkins et al. | 395/130 |
| 5,381,519 | * 1/1995 | Brown et al. | 395/132 |
| 5,550,960 | * 8/1996 | Shirman et al. | 395/130 |
| 5,649,082 | * 7/1997 | Burns | 395/130 |
| 5,844,567 | * 12/1998 | Gossett et al. | 345/430 |
| 5,870,509 | * 2/1999 | Alcorn | 382/293 |
| 5,900,882 | * 5/1999 | Jee | 345/430 |
| 6,072,496 | * 6/2000 | Guenter et al. | 345/419 |

\* cited by examiner

*Primary Examiner*—Matthew Luu
*Assistant Examiner*—Daniel J Chung
(74) *Attorney, Agent, or Firm*—Martine & Penilla, LLP

(57) ABSTRACT

The present invention provides a method and a device for generating texture coordinates for a selected pixel within a triangle for a texture wrapping operation. The selected pixel is defined within the triangle by a plurality of barycentric coordinates. The method includes receiving a set of texture coordinates for each of the vertices of the triangle and receiving a plurality of barycentric coordinates associated with the selected pixel. The method further includes determining a plurality of barycentric coefficients for the selected pixel from the texture coordinates of the vertices of the triangle. The barycentric coefficients are optimized to obtain a specified degree of precision, which is adapted to distinguish between neighboring texture coordinates. In addition, the method includes computing the texture coordinates based on the barycentric coefficients and the barycentric coordinates, wherein the texture coordinates are substantially distinct from neighboring texture coordinates.

25 Claims, 12 Drawing Sheets

HIGH PRECISION TEXTURE WRAPPING METHOD AND DEVICE

BACKGROUND OF THE INVENTION

The present invention relates to the field of computer graphics and, more particularly, to a method and device for providing high precision texture wrapping.

In modern computer graphics, images or objects are typically modeled by graphics primitives such as points, line segments, polygons, etc. Among the primitives, polygons, particularly triangles, have been commonly used in modeling 2D and 3D images of objects. The underlying reason for this is that polygons such as triangles are generally easier to generate and simpler to support in hardware than other primitives.

The conventional polygon modeling method, however, presents a problem in modeling images or objects having intricate and fine surface details. In particular, modeling such intricate and fine details requires smaller polygons. For example, a large flat wall, which in actuality is a single rectangle, might require thousands of individual bricks to model the intricate and fine details of the surface. Thus, the need to use smaller polygons significantly increases the number polygons that must be used to model an image or object. In computer graphics, processing cost is proportional to the number of polygons used in modeling an image. The reason that the processing cost increases as the number of polygons used increases is that each additional polygon requires more data processing, more data transformation, and more data storage. Hence, modeling of fine and intricate scenes or objects using micro-polygons has been an expensive and impractical process for all but the most expensive graphics systems.

Various alternatives to the micro-polygon modeling method have been devised in modeling images and objects having fine and intricate surface details such as, for example, dense vegetation, walls, etc. One such alternative approach is a method referred to as texture mapping or pattern mapping. In this method an image is applied to a polygon and this polygon with the applied image is drawn as a single polygon. The image is sometimes referred to as a texture or a texture map and its individual elements are sometimes referred to as texels. The texture map typically consists of rectangular arrays of texels, which are associated with data such as color, luminance, color, alpha value, etc. Alternatively, the texture map may be defined by procedural methods.

In texture mapping, a rectangular texture is generally mapped onto the surface of a polygon modeling an object. When mapping a rectangular texture onto a polygon, however, the size of the rectangular texture is often smaller than the size of the polygon. In such cases, a conventional method, which is commonly known as "texture wrapping," is typically used to apply the texture onto the polygon repeatedly until the polygon is entirely covered with the texture.

FIG. 1A illustrates a schematic diagram of an exemplary texture wrapping method. In this example, a rectangular texture 102 of intensity values is defined in a two-dimensional texture coordinate space (s, t) with s and t each ranging from 0 to 1. A polygon 104 has texture coordinates that are twice as large as the texture coordinates of the rectangular texture 102. In this arrangement, rectangular texture 102 is replicated four times onto polygon 104, thereby generating detailed and repeating surface images on the polygon.

When a relatively large number of polygons is used to model a large image or object such as, for example, a field of vegetation or grass, a rectangular texture may be applied thousands of times onto the polygon to generate an image of vegetation with a realistic appearance. Unfortunately in these cases, conventional texture wrapping methods generally do not provide a detailed texture surface due to the lack of precision at the higher texture space coordinates.

For example, FIG. 1B shows a schematic diagram of a conventional texture wrapping method as applied to a triangle 106 having large texture coordinates. Specifically, the triangle 106 is characterized by vertices $\alpha$, $\beta$, and $\gamma$, which have (s, t) texture coordinates of (99998, 1234), (99999, 1234.1), and (99999.17, 1235.769867), respectively. In this texture coordinate arrangement, the texture 102 from the lower texture coordinate may not be applied properly onto the triangle due to a lack of sufficient precision at the higher texture coordinate space. For example, even though the texture coordinates only differ by one or two units, over 20 integer bits may be needed to attain visual accuracy using conventional techniques.

A computer system typically implements texture mapping by assigning a specified number of bits to texture coordinates. For example, texture coordinate variables "s" and "t" may be represented as an 8-bit number. In this configuration, the 8-bit texture coordinate variables do not provide sufficient precision for higher texture coordinates such as (999, 999), to distinguish from neighboring texture coordinates. That is, the 8-bit texture coordinate may distinguish only the first $2^8$, i.e., 256, texture coordinate blocks. Thus, the remaining texture coordinates may not be accurately replicated onto the polygon 106, thereby resulting in unrealistic images.

Conventional texture application techniques often employ a well-known barycentric coordinate system based on the areas of sub-triangles within a triangle. For example, a barycentric coordinate system is defined in OpenGL®, version 1.1, available from Silicon Graphics, Inc. FIG. 2 illustrates an exemplary triangle 200 for implementing the barycentric coordinate system. The triangle 200 includes three sides 202, 204, and 206. The triangle 200 is defined by three vertices $\alpha$, $\beta$, and $\gamma$, which have three-dimensional texture coordinates $(s_\alpha, t_\alpha, r_\alpha)$, $(s_\beta, t_\beta, r_\beta)$, and $(s_\gamma, t_\gamma, r_\gamma)$, respectively.

An arbitrary point P within the triangle 200 is characterized by a coordinate $(s_P, t_P, r_P)$. The point P and the vertices $\alpha$, $\beta$, and $\gamma$ define three sides 208, 210, and 212, respectively. The sides 202, 204, and 206 of the triangle 200 and the sides 208, 210, and 212 form three sub-triangles 214, 216, and 218. In this configuration, the coordinate $(s_P, t_P, r_P)$ of the point P is uniquely defined by the areas A, B, and C of sub-triangles 214, 216, and 218, respectively. The areas A, B, and C form the basic coordinate units in the barycentric coordinate system.

To further simplify the barycentric coordinate system, if the area of the triangle 200 is normalized to 1, then the point P can be uniquely defined by the areas of any two sub-triangles. For example, if the areas of sub-triangles 214, 216, and 218 are A, B, and C, respectively, then A+B+C=1. Hence, the area C can be defined in terms of the other two areas: C=1−(A+B). Consequently, the coordinate (s, t, r) of the point P can then be defined by the following barycentric equations based on barycentric coordinates (A, B):

$s_P = (s_\alpha - s_\gamma)A + (s_\beta - s_\gamma)B + s_\gamma;$  Equation 1.1

$t_P = (t_\alpha - t_\gamma)A + (t_\beta - t_\gamma)B + t_\gamma;$  Equation 1.2 and $$r_p = (r_\alpha - r_\gamma)A + (r_\beta - r_\gamma)B + r_\gamma.$$ Equation 1.3

One drawback of using the conventional barycentric equations in a texture wrapping operation is that they may not provide sufficient precision for large texture coordinates. For example, if $s_\alpha$, $s_\beta$, and $s_\gamma$ are floating point numbers 1005.1, 1010.5, and 1006, respectively, a computer system that implements the barycentric equations may not provide sufficient precision to generate distinct and unique coordinates. In addition, computing $s_P$, $t_P$, and $r_P$ using such large floating point numbers requires a substantial number of subtraction operations, which require a significant number of subtractors to implement in hardware.

Thus, what is needed is a method and a device for efficiently performing texture wrapping with high precision even for large texture coordinates without requiring costly hardware.

SUMMARY OF THE INVENTION

Broadly speaking, the present invention fills these needs by providing a method and a device for generating texture coordinates for a selected pixel within a triangle for a texture wrapping operation. It should be appreciated that the present invention can be implemented in numerous ways, including as a process, an apparatus, a system, a device, a method, or a computer readable medium.

In one aspect of the invention, the present invention provides a method for generating texture coordinates for a selected pixel within a triangle for a texture wrapping operation. The selected pixel is defined within the triangle by a plurality of barycentric coordinates. The method includes receiving a set of texture coordinates for each of the vertices of the triangle and receiving a plurality of barycentric coordinates associated with the selected pixel. The method further includes determining a plurality of barycentric coefficients for the selected pixel from the texture coordinates of the vertices of the triangle. The barycentric coefficients are optimized to obtain a specified degree of precision, which is adapted to distinguish between neighboring texture coordinates. In addition, the method includes computing the texture coordinates based on the barycentric coefficients and the barycentric coordinates, wherein the texture coordinates are substantially distinct from neighboring texture coordinates.

In another aspect of the invention, a device for generating a set of texture coordinates for a selected pixel within a triangle for a texture wrapping operation is provided. The selected pixel is defined within the triangle by a plurality of barycentric coordinates. The device includes means for receiving a set of texture coordinates for each of the vertices of the triangle and means for receiving a plurality of barycentric coordinates associated with the selected pixel. The device also includes means for determining a plurality of barycentric coefficients for the selected pixel from the texture coordinates of the vertices of the triangle. The barycentric coefficients are optimized to obtain a specified degree of precision, which is adapted to distinguish between neighboring texture coordinates. The device further includes means for computing the texture coordinates based on the barycentric coefficients and the barycentric coordinates such that the texture coordinates are substantially distinct from neighboring texture coordinates.

In yet another aspect of the invention, a device for generating texture coordinates for a selected pixel within a triangle for a texture wrapping operation is provided. The selected pixel is defined within the triangle by a plurality of barycentric coordinates. The device includes vertex buffer circuitry and a barycentric evaluator. The vertex buffer circuitry is adapted to receive a set of texture coordinates for each of the vertices of the triangle and is configured to determine a plurality of barycentric coefficients for the selected pixel from the texture coordinates of the vertices of the triangle. The barycentric coefficients are further optimized to obtain a specified degree of precision, which is adapted to distinguish between neighboring texture coordinates. The barycentric evaluator is coupled to receive the barycentric coefficients from the vertex buffer circuitry. The barycentric evaluator also receives a plurality of barycentric coordinates associated with the selected pixel. The barycentric evaluator is configured to compute the texture coordinates based on the barycentric coefficients and the barycentric coordinates, wherein the texture coordinates are substantially distinct from neighboring texture coordinates.

The present invention advantageously performs texture wrapping in an efficient manner, even for large texture coordinates, without significant loss of precision by optimizing the coefficients of the barycentric equations. Furthermore, the coefficients of the barycentric equations are efficiently modified so that fewer subtraction steps are needed to compute the texture coordinates at a selected point within a triangle. Another benefit of the invention is that it reduces the number of subtractors needed to implement the method of the invention in a device. In general, for a texture coordinate having N dimensions, the present invention saves 2N subtraction steps or subtractors in computing a texture coordinate for a point within the triangle. Accordingly, the method and device of the present invention provide an efficient and economical means of determining the texture coordinates for texture wrapping without the need for a substantial number of expensive and complex subtractors and the associated supporting circuitry. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Figure 1A:
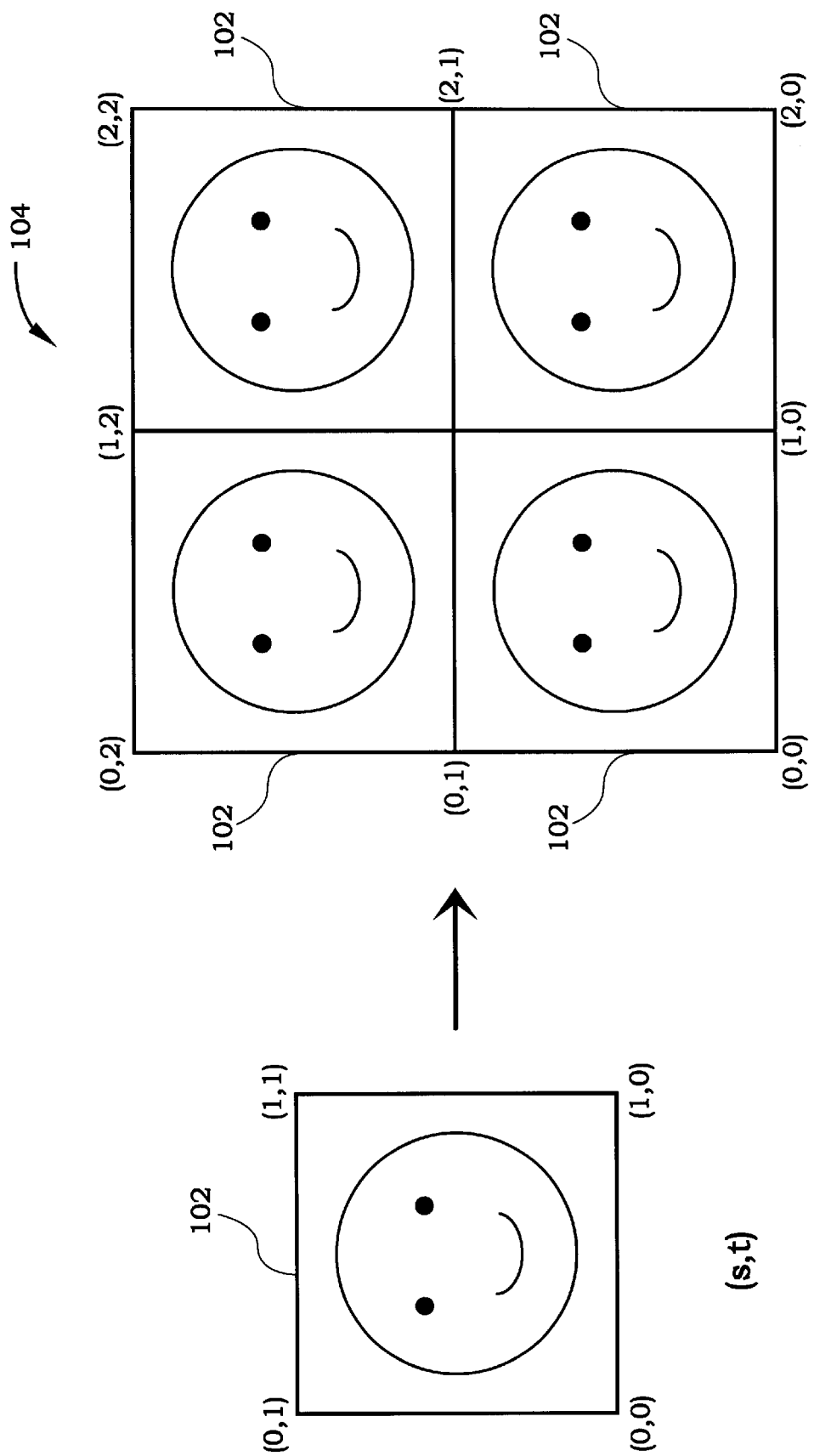
FIG. 1A illustrates a schematic diagram of an exemplary texture wrapping method.
Figure 1B:
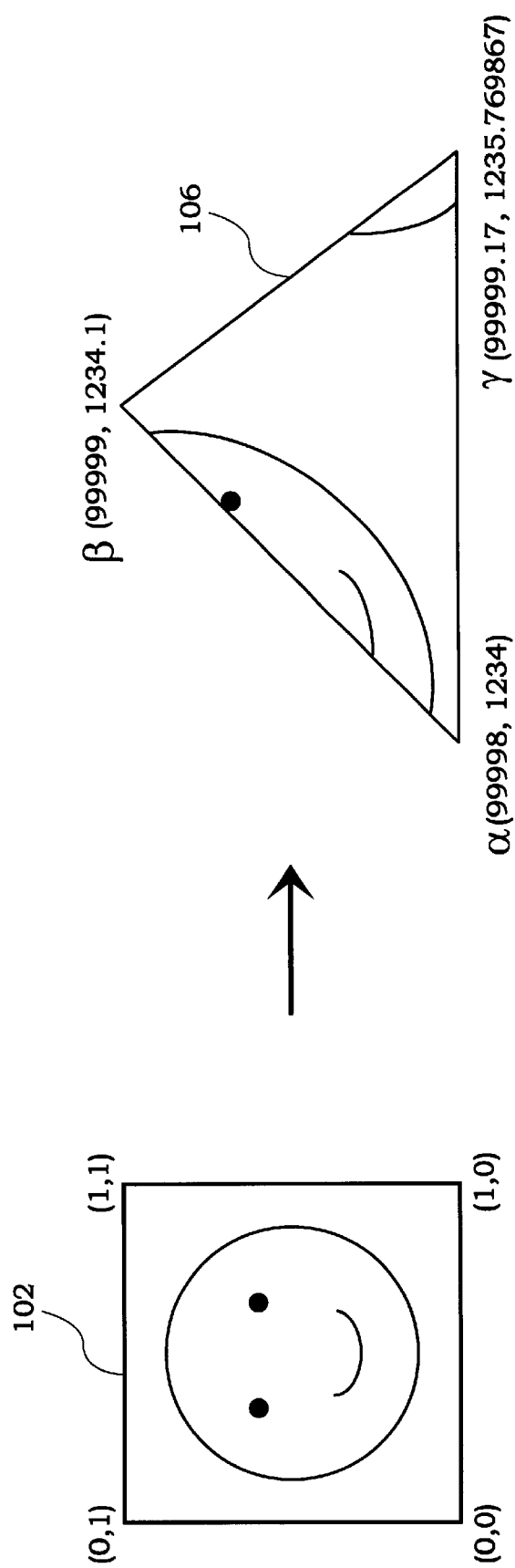
FIG. 1B shows a schematic diagram of a conventional texture wrapping method for an exemplary triangle with large texture coordinates.
Figure 2:
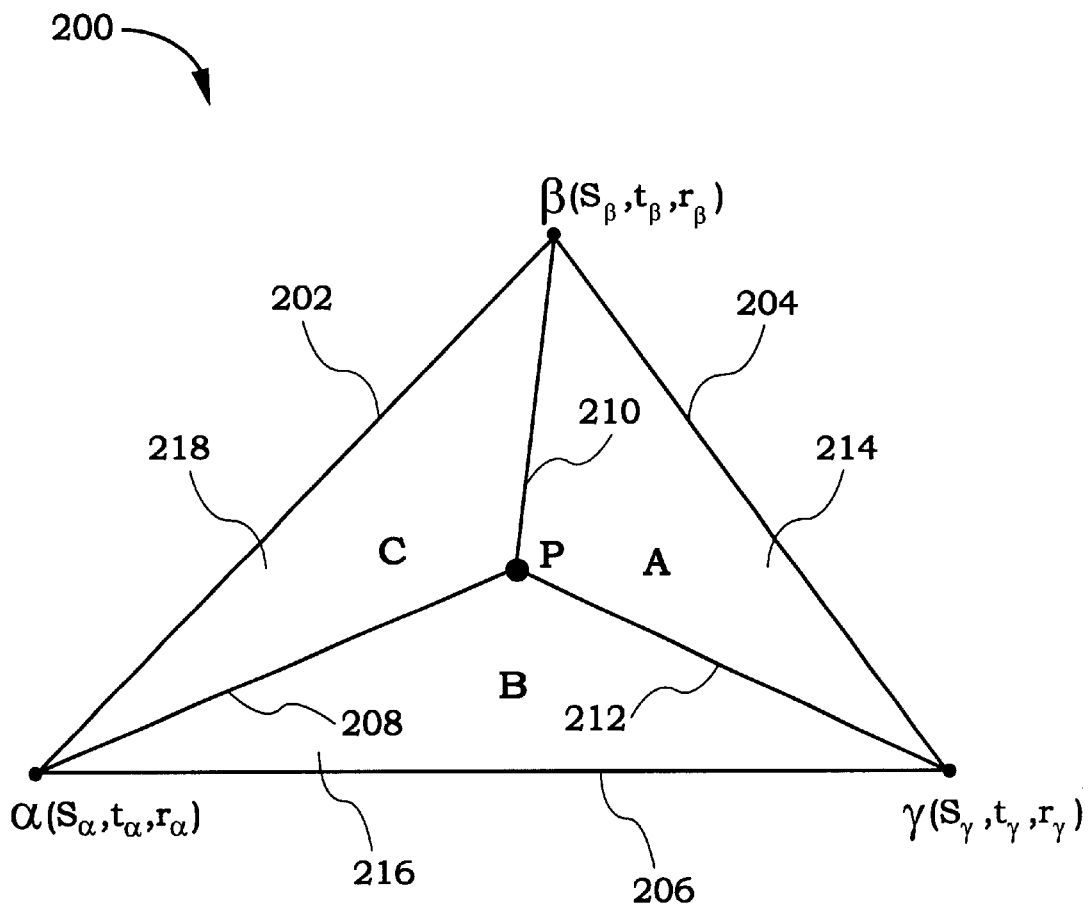
FIG. 2 illustrates an exemplary triangle for implementing a barycentric coordinate system.

Reference will now be made to the present preferred embodiments of the invention, examples of which are illustrated in the accompanying drawings. FIGS. 1A, 1B, and 2 are described above in the "Background of the Invention" section.

In the following detailed description of the present invention, which includes a method and a device for generating texture coordinates for a selected pixel within a triangle for a texture wrapping operation, numerous specific details are set forth to provide a thorough understanding of the present invention. It will be obvious to one skilled in the art, however, that the present invention may be practiced without these specific details. In other instances, well-known methods, procedures, components, and circuits have not been described in detail so as not to unnecessarily obscure certain aspects of the present invention.

The present invention provides an efficient method and device for generating texture coordinates of a selected pixel within a triangle for a texture wrapping operation. In particular, the present invention generates texture-coordinate optimized coefficients of barycentric equations through the use of a substantially reduced number of subtraction steps and subtractors, thereby reducing the cost of the hardware traditionally required for texture wrapping. At the same time, this scheme provides high precision for large texture coordinates by translating the texture coordinates of the vertices of the triangle, as will be described in more detail below.

Figure 3A:
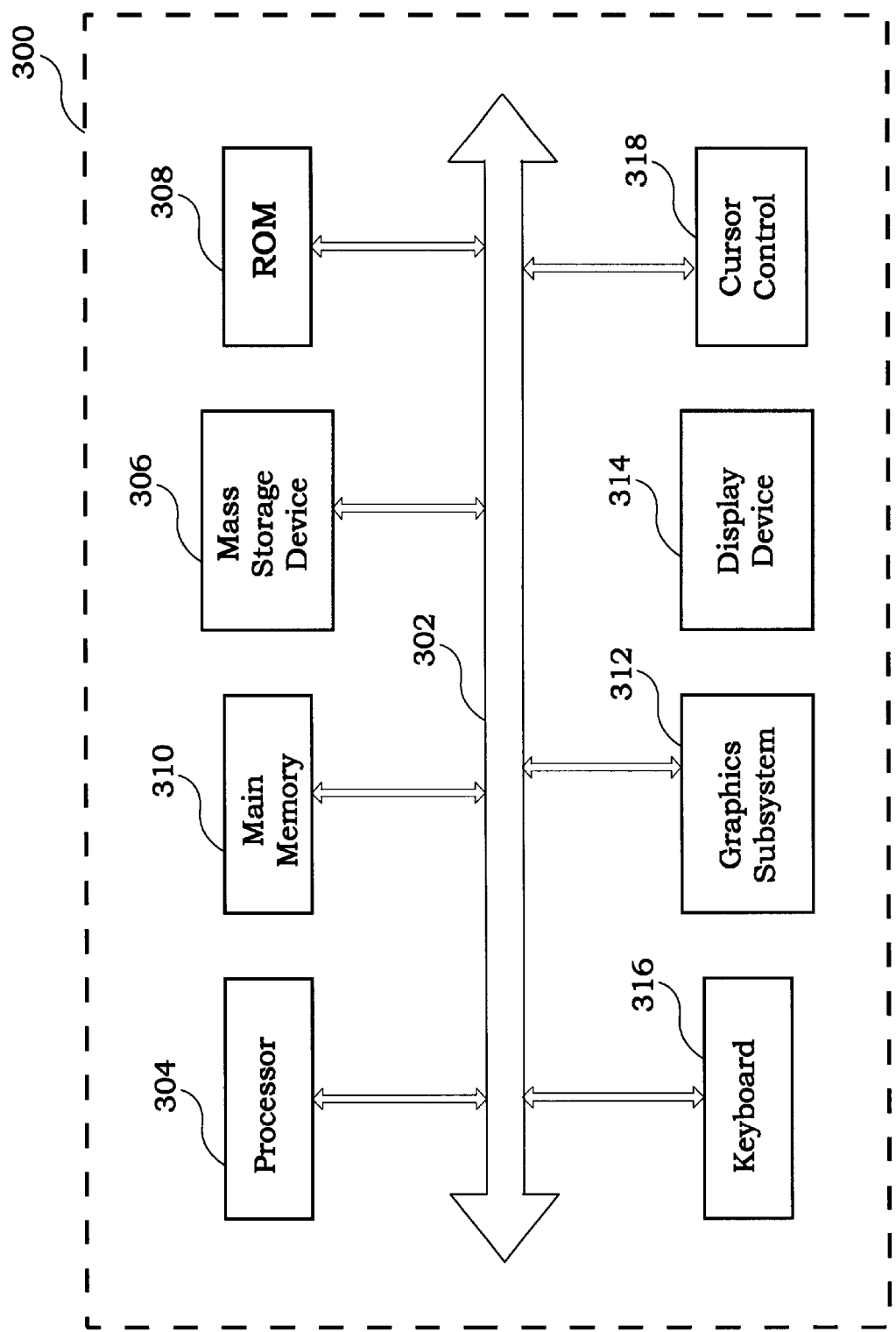
FIG. 3A illustrates a block diagram of a computer graphics system within which the present invention may be implemented or practiced.

FIG. 3A illustrates a block diagram of a computer graphics system 300 within which the present invention may be implemented or practiced. It should be appreciated that the computer graphics system 300 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 300 and are executed by processors therein.

The computer graphics system 300 may be any computer-controlled graphics system suitable for generating complex 2D or 3D images. The computer graphics system 300 includes a bus 302 for transmitting digital information between the various parts of the computer system. One or more processors 304 for processing information are coupled to the bus 302. The information, together with the instructions for processing the information, are stored in a hierarchical memory system comprised of a mass storage device 306, a read only memory (ROM) 308, and a main memory 310. The mass storage device 306 is used to store a vast amount of data and may include one or more hard disk drives, floppy disk drives, optical disk drives, tape drives, CD-ROM drives, or any number of other types of storage devices having media for storing data digitally. The ROM 308 is used to store digital data on a permanent basis, such as instructions for the microprocessors. The main memory 310 is used for storing digital data on an intermediate basis. The main memory 310 can be DRAM, SDRAM, RDRAM, or any other suitable memory for storing data while the computer graphics system 300 is turned on.

A graphics subsystem 312 may be included in the computer graphics system 300. The processor 304 provides the graphics subsystem 312 with graphics data, such as drawing commands, coordinate vertex data, and other data related to an object's geometric position, color, texture, shading, and other surface parameters. A display device 314 is coupled to the graphics subsystem 312 to receive image data (e.g., pixel data) for display. Alternatively, the display device 314 may be coupled to the graphics system 300 via the bus 302.

Other devices may also be coupled to the computer graphics system 300. For example, an alphanumeric keyboard 316 may be used for inputting commands and other information to processor 304 via the bus 302. Another type of user input device is cursor control device 318 (e.g., mouse, trackball, joystick, and touchpad) used for positioning a movable cursor and selecting objects on a computer screen.

Figure 3B:
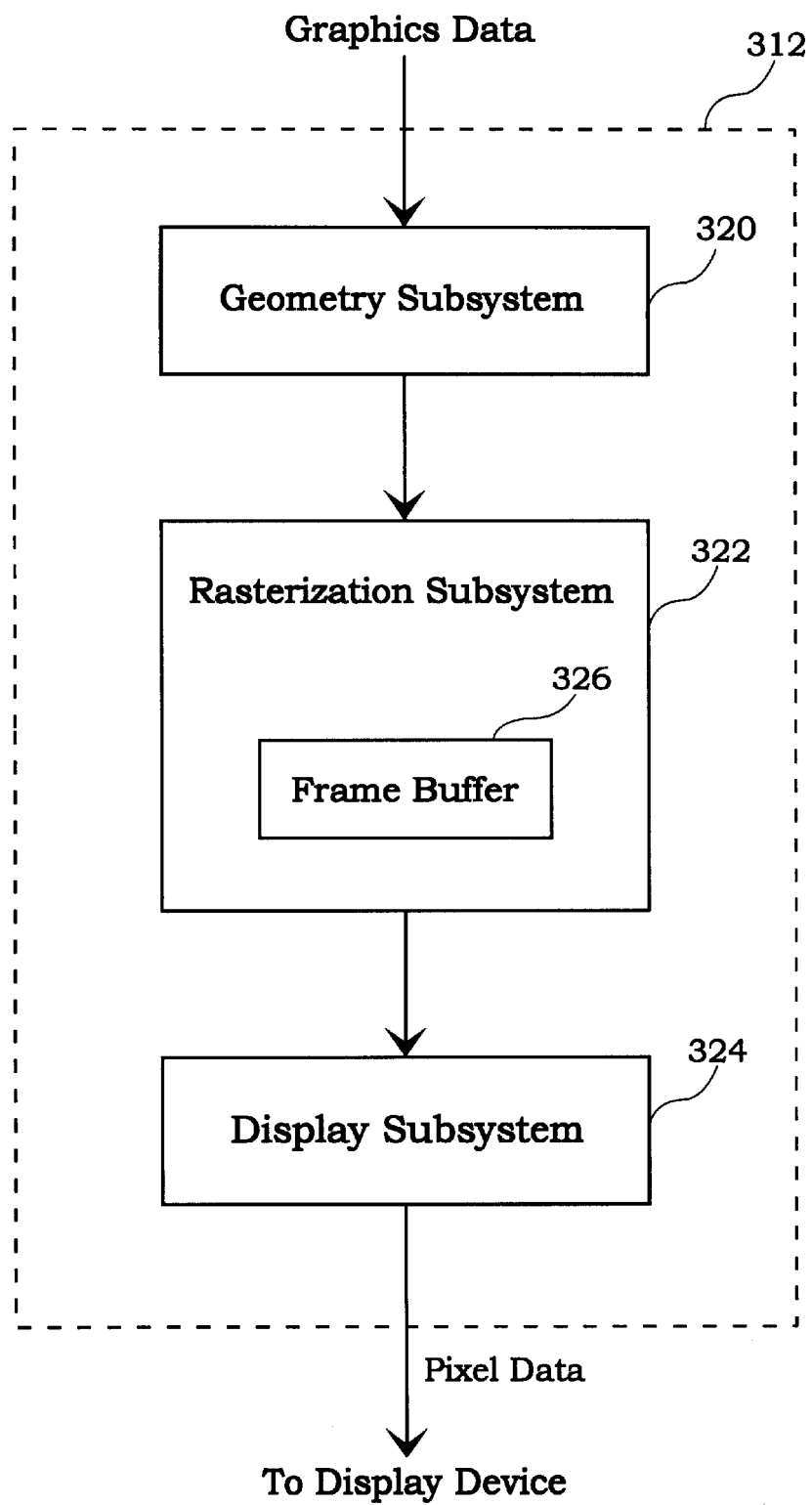
FIG. 3B shows a more detailed block diagram of the graphics subsystem 312 in accordance with one embodiment of the present invention.

FIG. 3B shows a more detailed block diagram of the graphics subsystem 312 in accordance with one embodiment of the present invention. The graphics subsystem includes a geometry subsystem 320, a rasterization subsystem 322, and a display subsystem 324. In this configuration, the geometry subsystem 320 receives object geometry in object coordinates (e.g., (u, v, w)) and texture download commands. The geometry subsystem 320 then converts the object geometry in object coordinates into object geometry in a screen coordinate system (e.g., (x, y, z)) and performs projection and transformation processes to give depth to a displayed object. The object geometry is preferably in the form of a polygon, and more preferably in the form of a triangle, for implementing a barycentric coordinate system. Those skilled in the art will appreciate that the barycentric coordinate system may be implemented with any of a variety of polygons by subdividing the polygons into constituent triangles.

In addition, the geometry subsystem 320 may map the vertices of the received geometry into texture coordinate space (s, t, r) to generate texture coordinates for the vertices. Preferably, the geometry is a triangle, which has three vertices, α, β, and γ. Accordingly, texture coordinates (s, t, r) are generated for each of the vertices α, β, and γ of a triangle. Alternatively, the texture coordinates for the vertices may be generated by the processor 304 and transmitted to the geometry subsystem 320.

The resulting primitives of triangles are then provided to the rasterization subsystem 322. The rasterization subsystem 322 performs the texture wrapping operation in accordance with one of the embodiments of the present invention and generates pixel data from the object geometry in the screen coordinate system. Additionally, the rasterization subsystem 322 also may perform Z-buffering, blending, anti aliasing, and other pixel-level functions. The resulting pixel values are stored in the frame buffer 326. The display subsystem 324 accesses the pixel data from the frame buffer 326 and converts the pixel data into analog signals for transmission to the display device 314 for display.

Figure 4A:
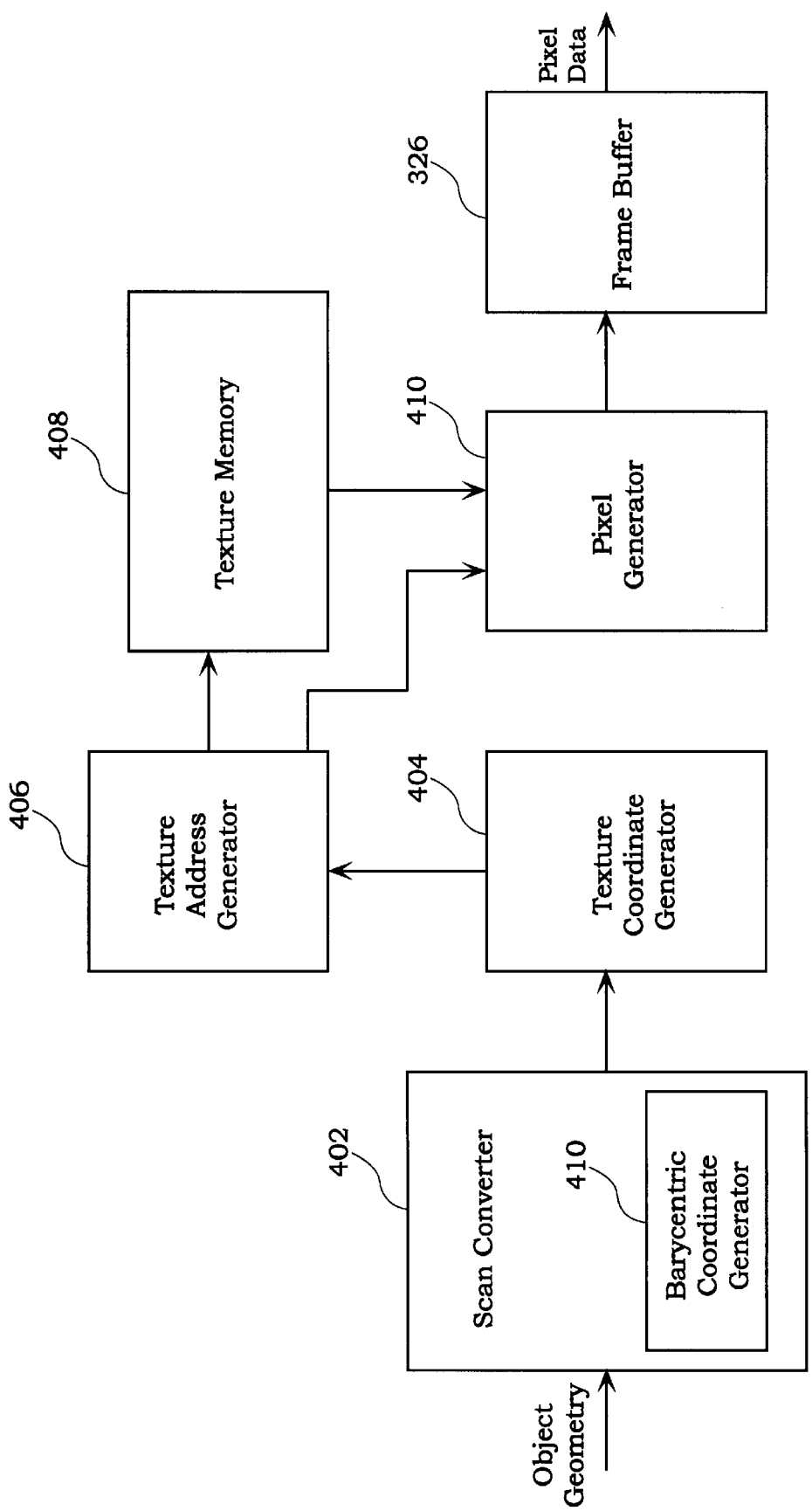
FIG. 4A illustrates, in accordance with one embodiment of the present invention, a block diagram of a rasterization subsystem for performing texture wrapping.

FIG. 4A illustrates, in accordance with one embodiment of the present invention, a block diagram of the rasterization subsystem 322 for performing texture wrapping. The rasterization subsystem 322 includes a scan converter 402, a texture coordinate generator (TCG) 404, a texture address generator 406, a texture memory 408, a pixel generator 410, and the frame buffer 326 (see FIG. 3B). The scan converter 402 receives an object geometry (e.g., triangle) in the screen coordinate system (x, y, z) for converting the geometry into fragments. Each fragment corresponds to a single pixel and includes pixel data values and associated barycentric coordinate values A and B. In addition, the fragment may include other values such as depth, alpha value, etc.

The scan converter 402 receives texture coordinates for the vertices of an object geometry. Preferably, the geometry is a triangle, which has three vertices: $\alpha$, $\beta$, and $\gamma$. The scan converter 402 includes a barycentric coordinate generator 410. The barycentric coordinate generator 410 selects a set of pixel points within the triangle and determines the barycentric coordinates for each of the selected pixel points. For example, the barycentric coordinates may be determined for the point P within the triangle 200 of FIG. 2 by computing the areas A and B of the sub-triangles 214 and 216, respectively. In a preferred embodiment, the barycentric coordinate generator 410 selects three pixel points P0, P1, and P2 within the triangle to generate barycentric coordinates (A0, B0), (A1, B1), and (A2, B2), respectively.

The fragments include the per pixel barycentric coordinates (A, B) of the selected set of pixels. The texture coordinate generator 404 is coupled to receive the fragments from the scan converter 402 and transform the barycentric coordinates (A, B) of the fragments within the triangle and the barycentric coefficients into texture coordinates (s, t, r) associated with each of the pixels in accordance with the embodiments of the present invention. The texture coordinates (s, t, r) of the selected set of pixels are then transmitted to the texture address generator 406.

The texture address generator 406 then generates texture addresses for the selected set of pixels from the associated texture coordinates. The texture address generator 406 is coupled to the texture memory 408, which stores one or more texture maps. The texture map includes a plurality of texture elements or texels. The texture memory 408 receives the texture addresses from the texture address generator 406 and outputs texels associated with the texture addresses to the pixel generator 410.

The pixel generator 410 is coupled to receive the texels and the fragments associated with the texels from the texture memory 408 and the texture address generator 406, respectively. The pixel generator 410 then combines a received texel with the associated fragment to generate pixel data (e.g., RGB data value) for the associated pixel. The pixel generator 410 then provides the pixel data to the frame buffer 326 for storage. The stored pixel data is then transmitted to the display subsystem 324 (see FIG. 3B) for subsequent display.

Figure 4B:
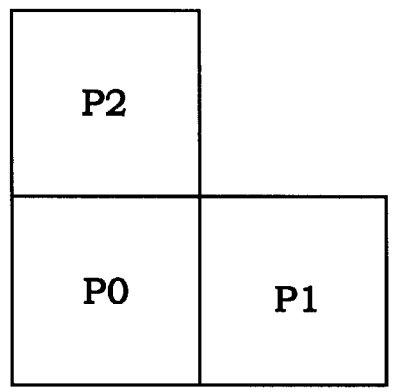
FIG. 4B shows a diagram of a set of pixels that are selected for generating barycentric coordinates in accordance with one aspect of the present invention.

FIG. 4B shows a diagram of a set of pixels that are selected for generating barycentric coordinates in accordance with one aspect of the present invention. The selected pixels comprise a fragment or area. The set includes three contiguous pixels P0, P1, and P2. The pixels P0, P1, and P2 for an "L" shape. Although the illustrated embodiment uses this pixel selection scheme, those skilled in the art will appreciate that the present invention may be implemented with any number of pixels, either contiguous or non-contiguous, and in any pattern.

As set forth above, Equations 1.1, 1.2, and 1.3 define texture coordinates $s_P$, $t_P$, and $r_P$, respectively, at a point P within a triangle. Each of these barycentric equations includes barycentric coefficients in the form of (C0–C2), (C1–C2), and C2. For computing the texture coordinates $s_P$, $t_P$, and $r_P$, the coefficient (C0–C2) corresponds to $(s_\alpha-s_\gamma)$, $(t_\alpha-t_\gamma)$, and $(r_\alpha-r_\gamma)$, respectively, while the coefficient (C1–C2) corresponds to $(s_\beta-s_\gamma)$, $(t_\beta-t_\gamma)$, and $(r_\beta-r_\gamma)$, respectively. Similarly, the coefficient C2 corresponds to $s_\gamma$, $t_\gamma$, and $r_\gamma$. Hence, Equations 1.1, 1.2, and 1.3 may be represented generically as follows:

$$C_P=(C0-C2)A+(C1-C2)B+C2, \qquad \text{Equation (2)}$$

where $C_P$ represents texture coordinate $s_P$, $t_P$, or $r_P$.

Figure 5A:
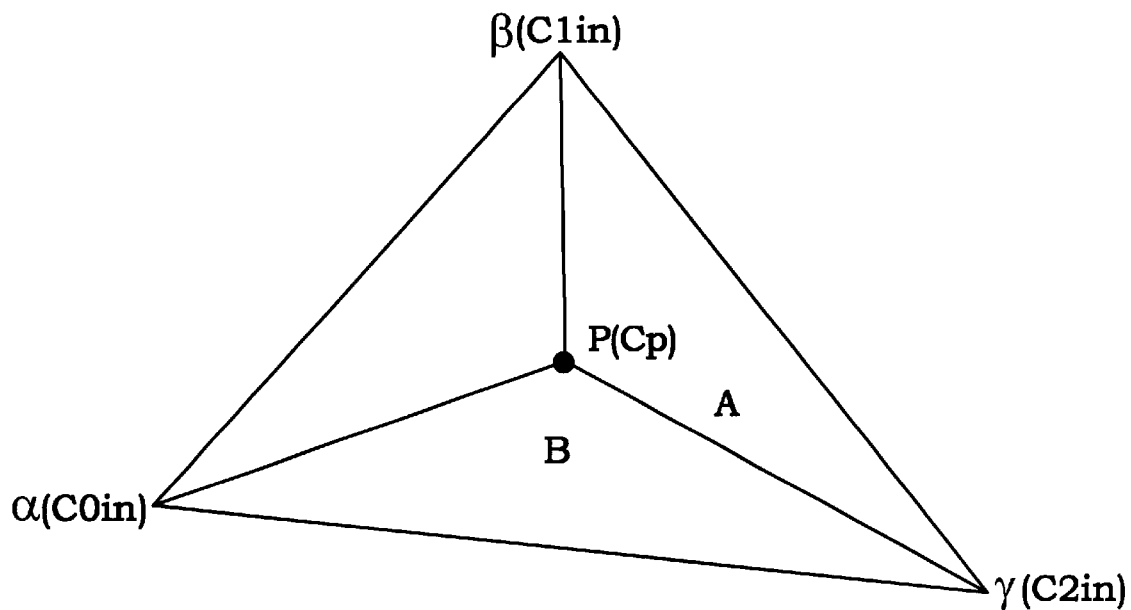
FIG. 5A illustrates an exemplary triangle for performing a high precision texture wrap operation.

The barycentric coefficients (C0–C2), (C1–C2), and C2 are optimized to provide high precision texture wrapping for a texture coordinate space in accordance with a preferred embodiment of the present invention. FIG. 5A illustrates an exemplary triangle 500 for performing the high precision texture wrap operation. By way of example, the triangle 500 includes three vertices ($\alpha$, $\beta$, and $\gamma$, which are characterized by exemplary vertex texture coordinates C0in, C1in, and C2in, respectively. The exemplary texture coordinates C0in, C1in, and C2in may represent the components of texture coordinates s, t, or r. For example, the texture coordinates C0in, C1in, and C2in may represent "s" texture coordinates s$\alpha$, s$\beta$, and s$\gamma$, respectively. By way of example, the values of the exemplary texture coordinates C0in, C1in, and C2in may be 1005.1, 1010.5, and 1006, respectively. Although the texture coordinates C0in, C1in, and C2in are used to represent exemplary texture coordinate "s," "t," or "r," those skilled in the art will recognize that they may also represent a plurality of other texture coordinates as well. As used herein in connection with the description of the invention, the term "plurality" means more than one element or item.

Figure 5B:
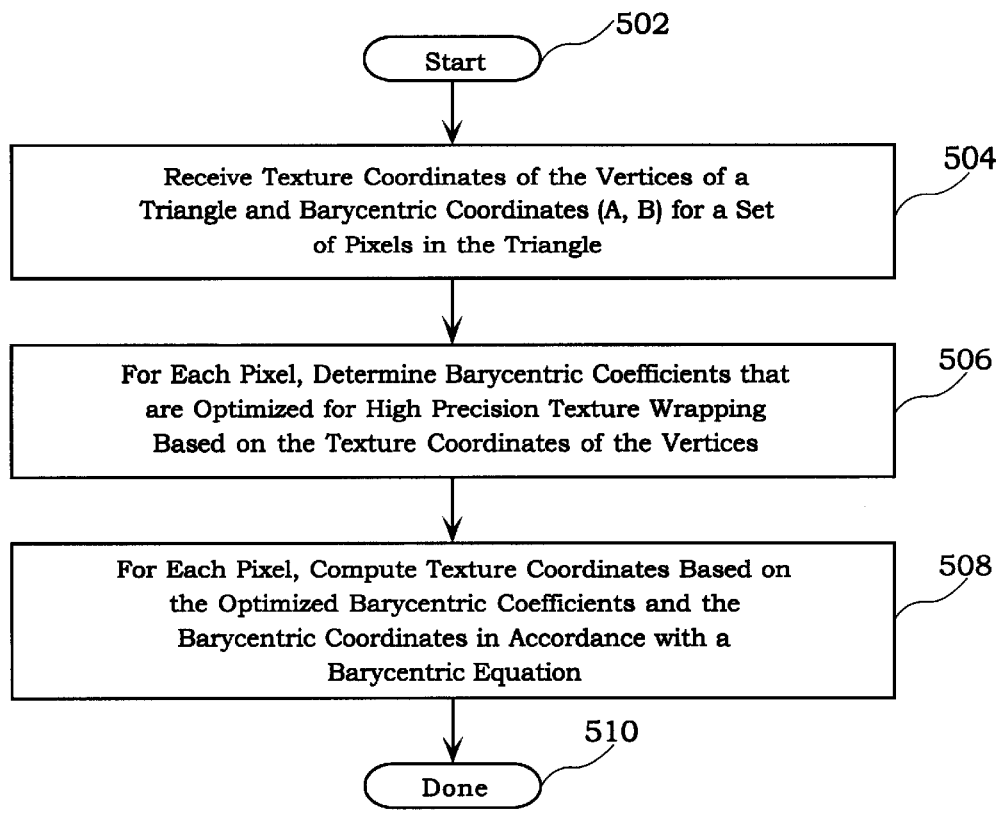
FIG. 5B illustrates a flow chart of a method for generating an exemplary texture coordinate $C_P$ for a pixel P based on vertex texture coordinates of a triangle and the barycentric coordinates (A, B).

Given the exemplary texture coordinates, the barycentric coefficients are then optimized for high precision texture wrapping. FIG. 5B illustrates a flow chart of a method for generating an exemplary texture coordinate $C_P$ (e.g., $s_P$, $t_P$, $r_P$) for a pixel P based on vertex texture coordinates of a triangle and the barycentric coordinates (A, B). The method begins in operation 502 and proceeds to operation 504, where the vertex texture coordinates of a triangle, e.g., triangle 500, and the barycentric coordinates (A, B) of the pixel P arc received. The triangle includes three vertices $\alpha$, $\beta$, and $\gamma$, which are characterized by texture coordinates $(s_\alpha, t_\alpha, r_\alpha)$, $(s_\beta, t_\beta, r_\beta)$, and $(s_\gamma, t_\gamma, r_\gamma)$, respectively. For simplicity, in the illustrated example, the vertices ($\alpha$, $\beta$, and $\gamma$ are defined by exemplary texture coordinates C0in, C1in, and C2in, which, in combination, may define any one of the texture coordinates "s," "t," and "r." The pixel P is defined by barycentric coordinates $A_P$ and $B_P$.

Next, in operation 506, the barycentric coefficients are optimized for high precision texture wrapping based on the texture coordinates of the vertices of the triangle. Specifically, a plurality of barycentric coefficients are determined for the selected pixel from the texture coordinates of the vertices of the triangle. The barycentric coefficients are optimized to obtain a specified degree of precision, which is adapted to distinguish between neighboring texture coordinates.

In operation 508, texture coordinate $C_P$ at pixel P is determined based on the optimized barycentric coefficients and the barycentric coordinates in accordance with Equation 2. The computed texture coordinate $C_P$ is substantially distinct from other neighboring texture coordinates. The operations 506 and 508 are performed for each pixel selected in the triangle. The method then terminates in operation 510.

Figure 5C:
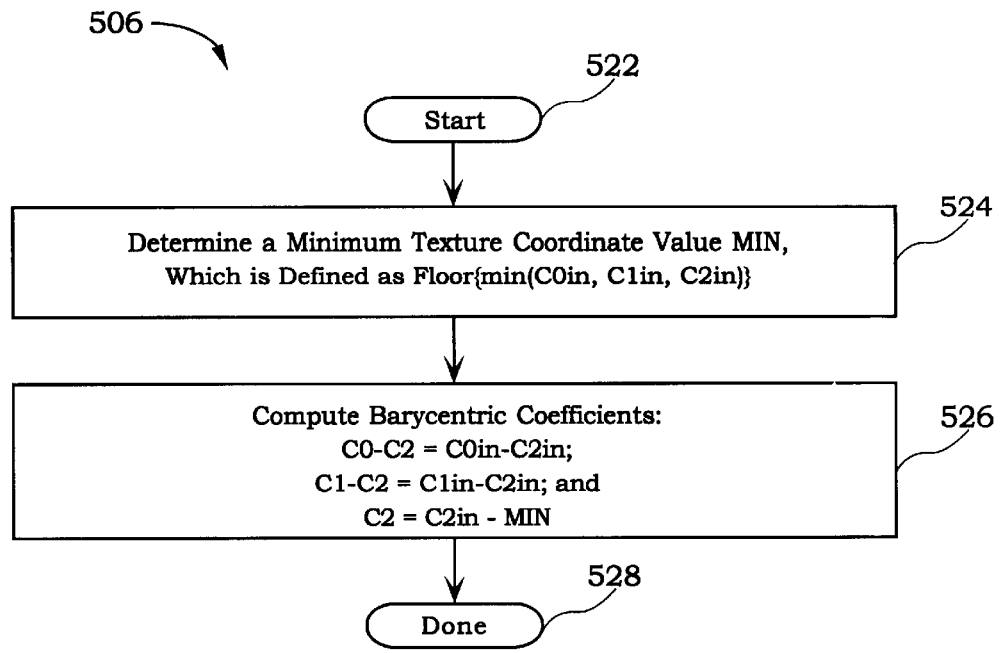
FIG. 5C shows a more detailed flow chart of an operation for determining wrap optimized barycentric coefficients in accordance with one aspect of the present invention.

FIG. 5C shows a more detailed flow chart of the operation 506 for determining wrap-optimized barycentric coefficients in accordance with one embodiment of the present invention. The operation 506 begins in operation 522 and proceeds to operation 524, where a minimum texture coordinate value MIN is determined from the three coordinate values C0in, C1in, and C2in. The minimum texture coordinate value MIN is defined as floor $\{\min(s_\alpha, s_\beta, s_\gamma)\}$, where the function "min" selects a minimum value and the function "floor" determines the largest integer value that is less than or equal to the minimum value. Applying this definition to the triangle 500, the minimum texture coordinate value MIN is floor $\{\min(1005.1, 1010.5, 1006)\}$, which is 1005. In one embodiment, the texture coordinates of the vertices of the triangle may be translated into revised texture coordinates such that the texture coordinates fit within a specified number range. For example, the texture coordinates C0in, C1in, and C2in of vertices α, β, and γ may be effectively translated to 0.1, 5.5, and 1.0, respectively.

Next, in operation 526, the barycentric coefficients (C0–C2), (C1–C2), and C2 are determined in accordance with the following barycentric coefficient equations:

$$C0-C2=C0in-C2in; \qquad \text{Equation 3.1}$$

$$C1-C2=C1in-C2in; \qquad \text{Equation 3.2}$$

and $$C2=C2in-MIN. \qquad \text{Equation 3.3}$$

The operation 526 saves substantial steps in computing the barycentric coefficients. For example, a more roundabout method of computing the barycentric coefficient (C0–C2) would be to compute [(C0in–MIN)–(C2in–MIN)]. Likewise, such a method would also compute the barycentric coefficient (C1–C2) by calculating [(C1in–MIN)–(C2in–MIN)]. Thus, the operation 526 effectively saves four subtraction steps per texture coordinate s, t, or r in computing the texture coordinates at the pixel P. Accordingly, twelve subtraction steps are saved per triangle. Additionally, it should be noted that reusing the (C2in–MIN) value saves two subtraction steps or subtractors.

Therefore, this scheme saves two subtractors per texture coordinate or six subtractors per pixel over the trivially optimized approach when implemented in hardware. For a generic texture coordinate system having N texture coordinate dimensions (e.g., s, t, r, etc.), the operation 526 would save 2N subtractors. The operation 506 then terminates in operation 528.

Figure 6:
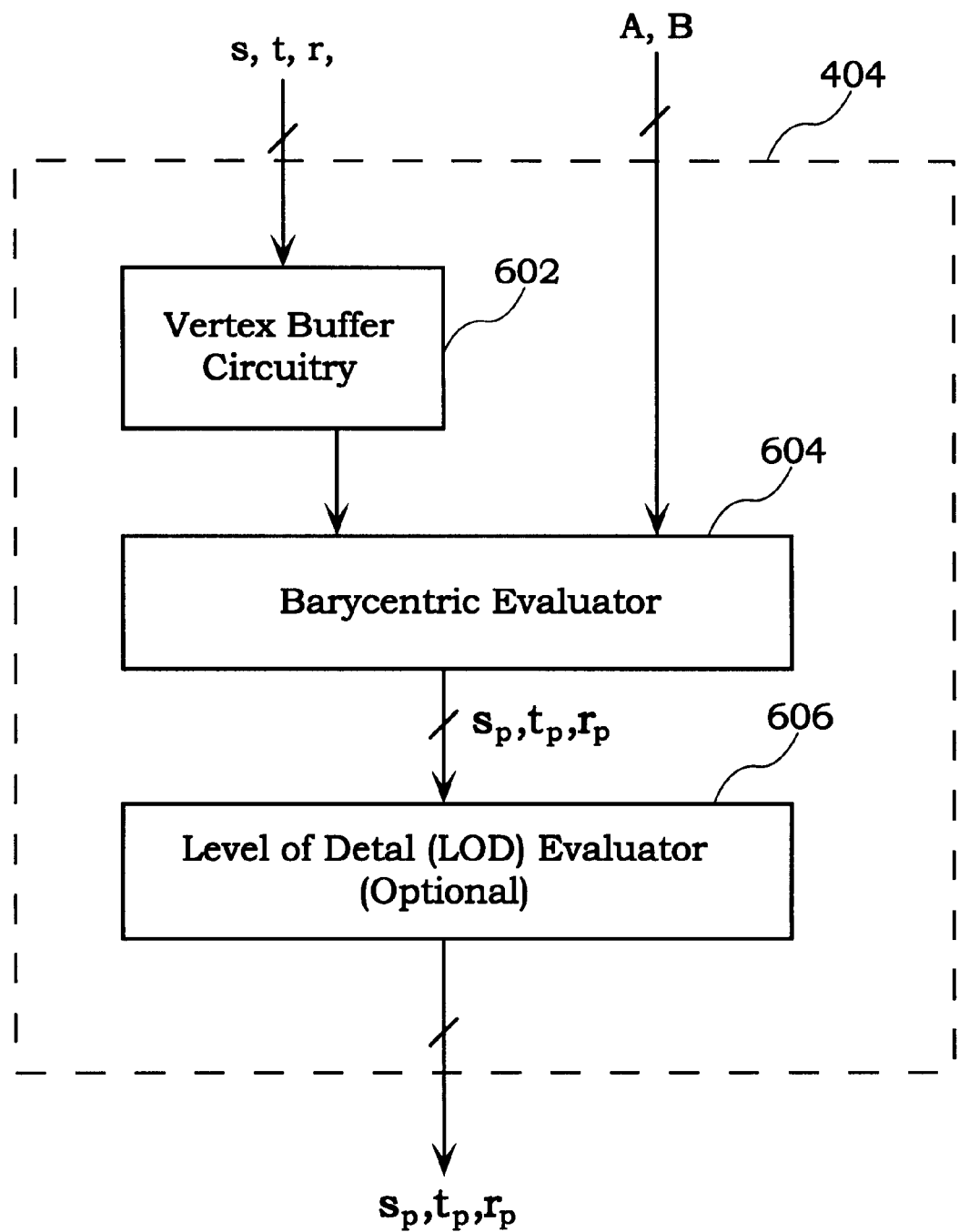
FIG. 6 illustrates a more detailed block diagram of a texture coordinate generator in accordance with one aspect of the present invention.

FIG. 6 illustrates a more detailed block diagram of the texture coordinate generator 404 in accordance with one embodiment of the present invention. The texture coordinate generator 404 is adapted to implement the method shown in FIGS. 5B and 5C. The texture coordinate generator 504 includes vertex buffer circuitry 602 and a barycentric evaluator 604. The texture coordinate generator 504 transforms barycentric coordinates (A, B) of a pixel P and the coordinates (s, t, r) of the vertices α, β, γ into texture coordinates ($s_P$, $t_P$, $r_P$) that are optimized for texture wrapping.

The texture coordinate generator 404 receives "s," "t," and "r" texture coordinates of the vertices of a triangle. In one embodiment, the "s," "t," and "r" coordinates are received in a floating point number format. Although any floating point number format may be used, a preferred embodiment employs an S23E8 floating point number format, which includes a sign bit, an 8-bit exponent, and a 23-bit fraction or mantissa.

The texture coordinate generator 404 may scale the received "s," "t," and "r" texture coordinates to fit into another number format, which may be specified for texturing. For example, the S23E8 "s," "t," and "r" data may be scaled to fit into an S17.8 fixed point format, which includes a sign bit, 17 integer bits, and 8 fraction bits.

For wrap texture addressing, the texture coordinate generator 404 translates the "s," "t," and "r" coordinates such that their integer parts, which will become wrap bits, fit into a specified minimum range. For example, the translation may be performed by taking the smallest "s," "t," and "r" coordinates over the three vertices and determining the integer translations needed to reduce the integer part of the texture coordinate to zero.

The vertex buffer circuitry 602 receives the texture coordinates of the three vertices α, β, and γ of the triangle in the form of coordinates (s, t, r) and computes wrap optimized barycentric coefficients (C0–C2), (C1–C2), and C2. Preferably, the vertex buffer circuitry 602 implements the operation 506 shown in FIGS. 5B and 5C. More specifically, the vertex buffer circuitry 602 receives and stores texture coordinate information "s," "t," and "r" for each vertex on a per triangle basis. The vertex buffer circuitry 602 performs coordinate translation and scaling for large texture coordinates, floating-point to fixed-point conversion, and stores the coordinates for the vertices.

The barycentric evaluator 604 receives the barycentric coordinates (A, B) as well as the barycentric coefficients. The barycentric evaluator 604 applies the barycentric coordinates to the vertex data received from the vertex buffer circuitry 602 to generate texture coordinates at a pixel (e.g., pixel P) in accordance with a barycentric equation. Preferably, the barycentric evaluator computes the texture for three pixels P0, P1, and P2 simultaneously in parallel.

The texture coordinate generator 404 may include an optional level-of-detail (LOD) evaluator 606 for performing well-known mip-mapping operations. The LOD evaluator 606 receives the texture coordinates of the pixels P0, P1, and P2 in parallel and selects a mip-map based on the projection of texels to a viewer. The LOD evaluator 606 then discards one of the pixels and outputs the texture coordinates of the pixels P0 and P1. Although the present embodiment is illustrated by three pixels P0, P1, and P2, those skilled in the art will appreciate that the texture coordinate generator 404 may process any number of pixel texture coordinates and discard any suitable number of pixel texture coordinates.

Figure 7:
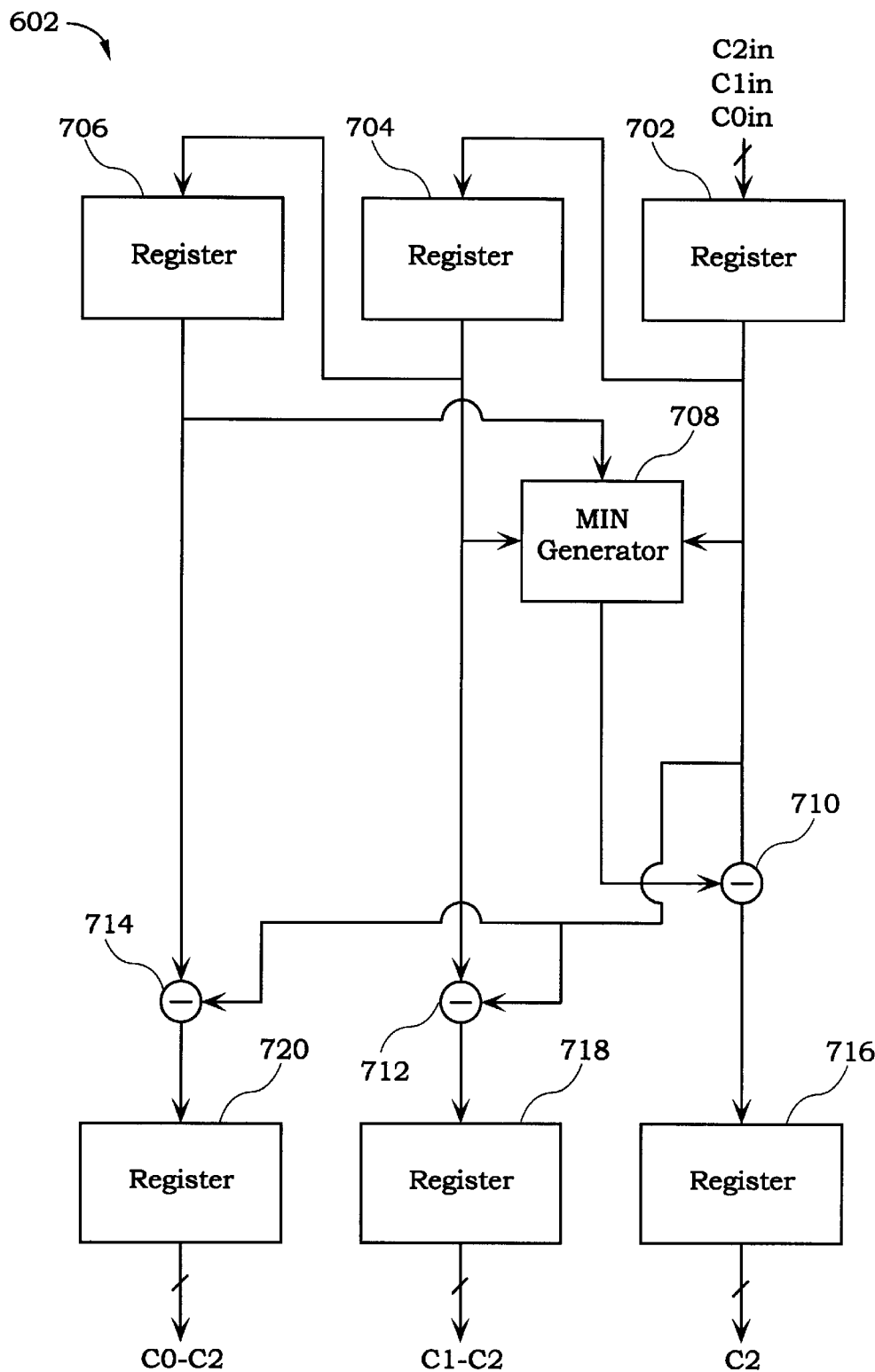
FIG. 7 shows a more detailed schematic diagram of the vertex buffer circuitry in accordance with one aspect of the present invention.

FIG. 7 shows a more detailed schematic diagram of the vertex buffer circuitry 602 in accordance with one aspect of the present invention. The vertex buffer circuitry 602 receives per vertex texture coordinate "s," "t," and "r" data in S23E8 format and stores them in a double buffer so that while one geometric primitive (e.g., a triangle, a line, a point) is being iterated, the vertex information for the next primitive can be loaded. The loading operation may take several clock cycles for a triangle with one texture. In a preferred embodiment, up to four sets of texture coordinates for a vertex are available. Although up to four sets of texture coordinates are used in this preferred embodiment, it should be recognized that any number of texture coordinate sets may be used to implement the present invention.

The vertex buffer circuitry 602 includes a plurality of serially coupled registers 702, 704, and 706 to receive and store three sets of vertex texture coordinates "s," "t," and "r" of a triangle in parallel. For example, the registers 702, 704, and 706 are arranged to sequentially receive and store exemplary texture coordinates C0in, C1in, and C2in. A MIN generator 708 is coupled to the registers 702, 704, and 706 to receive the texture coordinates C0in, C1in, and C2in and selects a minimum texture coordinate value. The MIN generator 708 then rounds down the minimum texture coordinate to the nearest integer value to generate a MIN value. The MIN value is transmitted to a subtractor 710. The subtractor 710 is coupled to receive texture coordinates from the register 702 and the MIN generator 708. The subtractor 710 then outputs the (C2in–MIN) value, which corresponds to the barycentric coefficient C2. The barycentric coefficient C2is transmitted to a register 716 for storage.

A subtractor 712 is coupled to receive texture coordinates from the registers 702 and 704 to generate an output value (C1in–C2in). The output (C1in–C2in) corresponds to the barycentric coefficient (C1–C2), which is then transmitted to a register 718 for storage. On the other hand, a subtractor 718 is coupled to receive texture coordinates from the registers 702 and 706 to produce an output (C0in–C2in). The output (C0in–C2in) corresponds to the barycentric coefficient (C0–C2), which is transmitted to a register 720 for storage. The thus-generated barycentric coefficients C2, (C1–C2), and (C0–C2) are then provided to the barycentric evaluator 604 (see FIG. 6).

Figure 8A:
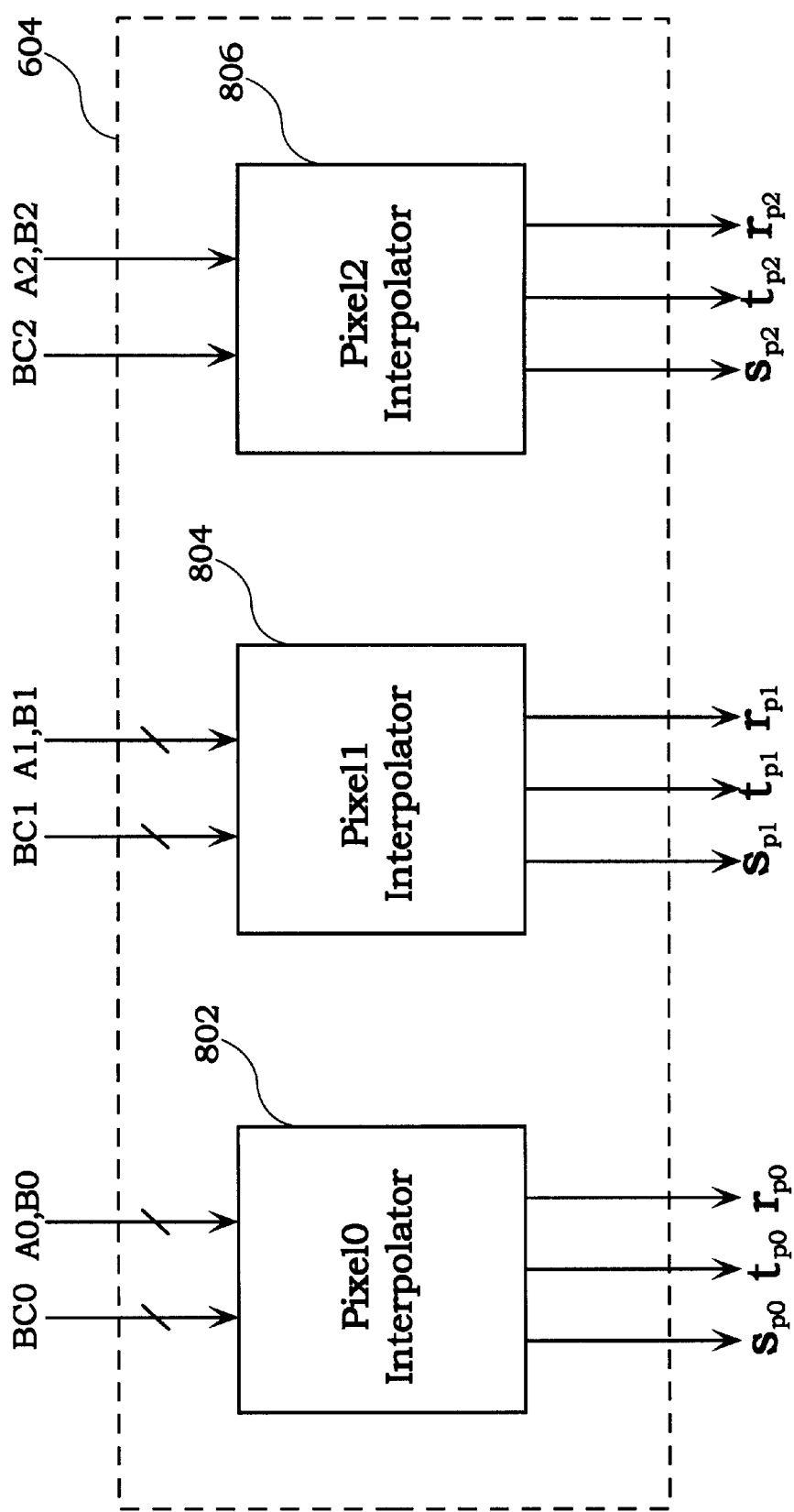
FIG. 8A illustrates a more detailed block diagram of a barycentric evaluator in accordance with one embodiment of the present invention.

FIG. 8A illustrates a more detailed block diagram of the barycentric evaluator 604 in accordance with one embodiment of the present invention. The barycentric evaluator 604 includes a plurality of interpolators 802, 804, and 806. The interpolators 802, 804, and 806 are associated with selected pixels P0, P1, and P2, respectively, and receive the associated barycentric coefficients BC0, BC1, and BC2 and associated barycentric coordinates (A0, B0), (A1, B1), (A2, B2), respectively. Each of the interpolators 802, 804, and 806 is configured to interpolate a texture coordinate $(s_P, t_P, r_P)$ at the pixel positions P0, P1, and P2, respectively, based on the associated barycentric coefficients and barycentric coordinates in accordance with the barycentric equation. The generated texture coordinates are then transmitted to the texture address generator 406 (see FIG. 4A), which generates the texture address based on the texture coordinates.

Figure 8B:
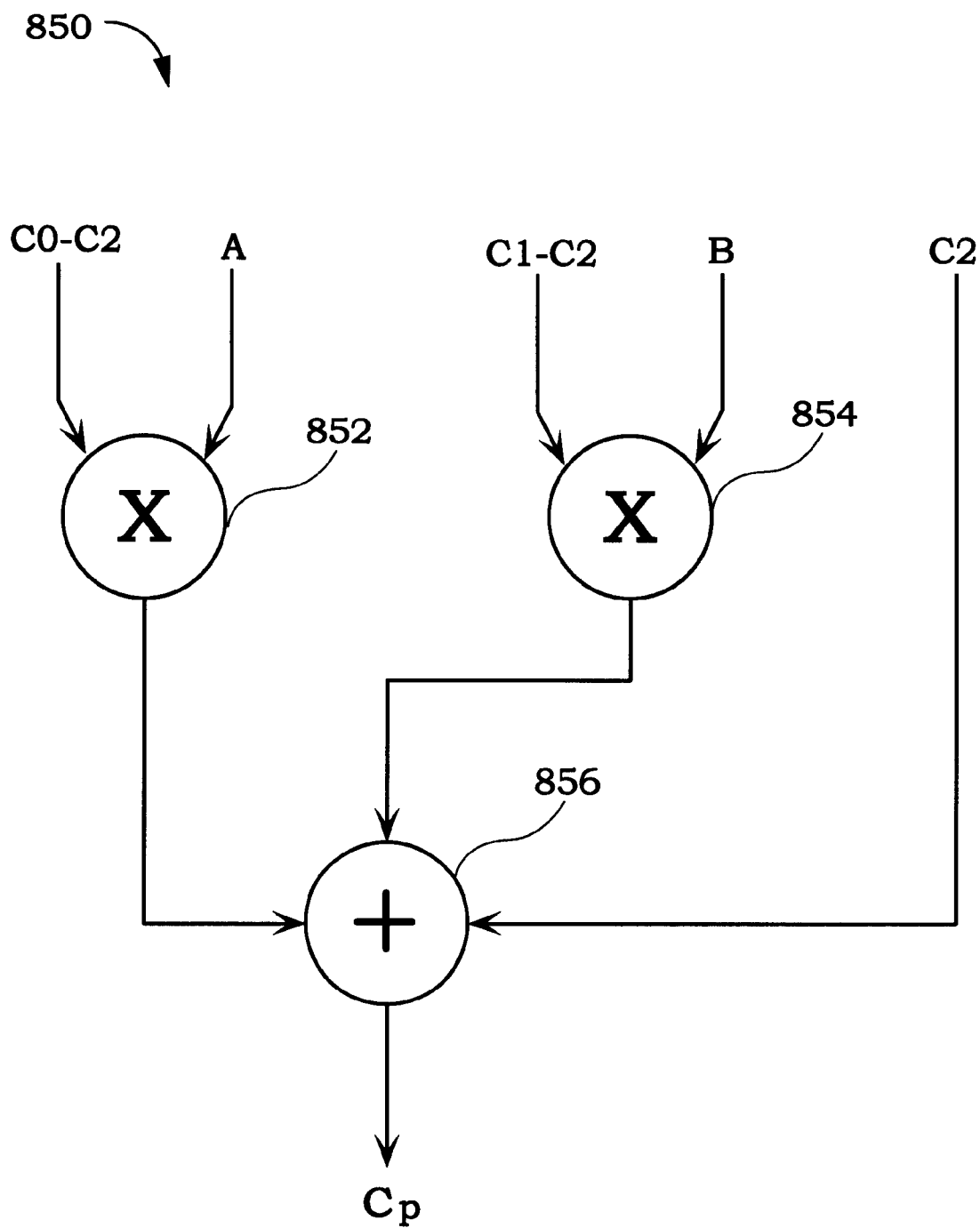
FIG. 8B illustrates an exemplary interpolator for interpolating a texture coordinate $C_P$ from exemplary barycentric coefficients (C0–C2), (C1–C2), and C2, and barycentric coordinates A and B.

FIG. 8B illustrates an exemplary interpolator 850 for interpolating a texture coordinate $C_P$ from exemplary barycentric coefficients (C0–C2), (C1–C2), and C2, and barycentric coordinates A and B. Each of the interpolators 802, 804, and 806 (see FIG. 8A) may include one or more of interpolators 850 for computing a texture coordinate. The interpolator 850 includes a pair of multipliers 852, 854 and an adder 856. The multiplier 852 receives the barycentric coefficient (C0–C2) and the barycentric coordinate A to generate a product, (C0–C2)A. The multiplier 854, on the other hand, receives the barycentric coefficient (C1–C2) and the barycentric coordinate B to generate a product, (C1–C2)B. The adder 856 receives a barycentric coefficient C2 and the products (C0–C2)A and (C1–C2)B to add the input terms. The adder 856 thus generates a sum, which corresponds to the texture coordinate $C_P$. The arithmetic performed by the multipliers 852, 854 and the adder 856 may be in either floating point or fixed-point format.

The present invention thus performs texture wrapping in an efficient manner, even for large texture coordinates, without significant loss of precision by optimizing the coefficients of the barycentric equations. In addition, the coefficients of the barycentric equations are efficiently modified so that fewer subtraction steps are needed to compute the texture coordinates at a selected point within a triangle. Another benefit of the invention is that it reduces the number of subtractors needed to implement the method of the invention in a device. In general, for a texture coordinate having N dimensions, the present invention saves 2N subtraction steps or subtractors in computing a texture coordinate for a point within the triangle. Accordingly, the method and device of the present invention provide an efficient and economical means of determining the texture coordinates for texture wrapping without the need for a substantial number of expensive and complex subtractors and the associated supporting circuitry.

In summary, the present invention enables efficient texture wrapping for texture coordinates, particularly large texture coordinates, by optimizing the coefficients of the barycentric equation. The invention has been described herein in terms of several preferred embodiments. Other embodiments and equivalents of the invention will be apparent to those skilled in the art from consideration of the specification and practice of the invention. For example, as described above, any number and any pattern of pixels within a triangle may be selected to generate texture coordinates in parallel. The embodiments and preferred features described above should be considered exemplary, with the invention being defined by the appended claims.

What is claimed is:

1. In a computer graphics system, a method for generating texture coordinates for a selected pixel within a triangle for a texture wrapping operation, the triangle having a plurality of vertices, the selected pixel being defined within the triangle by a plurality of barycentric coordinates, the method comprising:

receiving a set of texture coordinates for each of the vertices of the triangle;

receiving a plurality of barycentric coordinates associated with the selected pixel;

determining a plurality of barycentric coefficients for the selected pixel from the texture coordinates of the vertices of the triangle, the barycentric coefficients being optimized to obtain a specified degree of precision, the specified degree of precision being adapted to distinguish between neighboring texture coordinates; and computing the texture coordinates based on the barycentric coefficients and the barycentric coordinates, wherein the texture coordinates are substantially distinct from neighboring texture coordinates.

2. The method as recited in claim 1, wherein the operation of determining the barycentric coefficients comprises:

translating the texture coordinates of the vertices of the triangle into revised texture coordinates such that the texture coordinates fit within a specified number range.

3. The method as recited in claim 1, wherein the operation of determining the barycentric coefficients comprises:

determining a minimum texture coordinate value from the texture coordinates of the vertices of the triangle; and computing the barycentric coefficients.

4. The method as recited in claim 3, wherein the operation of determining the minimum texture coordinate value comprises:

selecting a minimum texture coordinate from the texture coordinates of the vertices of the triangle; and determining the minimum texture coordinate value by computing a largest integer value that is equal to or less than the selected minimum texture coordinate.

5. The method as recited in claim 4, wherein the texture coordinates for the vertices of the triangle include C0in, C1in, and C2in, and wherein the operation of computing the barycentric coefficients comprises:

determining a first barycentric coefficient by computing (C0in–C2in);

determining a second barycentric coefficient by computing (C1in–C2in); and determining a third barycentric coefficient by computing C2in minus the minimum texture coordinate value.

6. The method as recited in claim 5, wherein the barycentric coordinates include A and B, where A and B correspond to areas of sub-triangles defined by the selected pixel and the vertices of the triangle in a screen space.

7. The method as recited in claim 1, wherein the texture coordinates are computed by interpolation based on the barycentric coefficients and the barycentric coordinates.

8. The method as recited in claim 1, wherein the texture coordinates are computed in accordance with a barycentric equation.

9. The method as recited in claim 1, wherein each of the vertices and the selected pixel are associated with texture coordinates (s, t, r) and wherein the barycentric coefficients are determined for each of the texture coordinates (s, t, r) of the selected pixel.

10. The method as recited in claim 1, wherein the method selects a set of selected pixels within the triangle, wherein the method determines the barycentric coefficients and the texture coordinates of each of the selected set of pixels in parallel.

11. A device for generating texture coordinates for a selected pixel within a triangle for a texture wrapping operation, the triangle having a plurality of vertices, the selected pixel being defined within the triangle by a plurality of barycentric coordinates, the device comprising:

means for receiving a set of texture coordinates for each of the vertices of the triangle;

means for receiving a plurality of barycentric coordinates associated with the selected pixel;

means for determining a plurality of barycentric coefficients for the selected pixel from the texture coordinates of the vertices of the triangle, the barycentric coefficients being optimized to obtain a specified degree of precision, the specified degree of precision being adapted to distinguish between neighboring texture coordinates; and means for computing the texture coordinates based on the barycentric coefficients and the barycentric coordinates such that the texture coordinates are substantially distinct from neighboring texture coordinates.

12. The device as recited in claim 1, wherein the means for determining the barycentric coefficients comprises:

means for translating the texture coordinates of the vertices of the triangle into revised texture coordinates such that the texture coordinates fit within a specified number range.

13. The device as recited in claim 1, wherein the means for determining the barycentric coefficients comprises:

a minimum value generator for determining a minimum texture coordinate value from the texture coordinates of the vertices of the triangle; and means for computing the barycentric coefficients.

14. The device as recited in claim 13, wherein the means for determining the minimum texture coordinate value comprises:

means for selecting a minimum texture coordinate from the texture coordinates of the vertices of the triangle; and means for determining the minimum texture coordinate value by computing a largest integer value that is equal to or less than the selected minimum texture coordinate.

15. The device as recited in claim 14, wherein the texture coordinates for the vertices of the triangle include C0in, C1in, and C2in, and wherein the means for computing the barycentric coefficients comprises:

means for determining a first barycentric coefficient by computing (C0in–C2in);

means for determining a second barycentric coefficient by computing (C1in–C2in); and means for determining a third barycentric coefficient by computing C2in minus the minimum texture coordinate value.

16. A device for generating texture coordinates for a selected pixel within a triangle for a texture wrapping operation, the triangle having a plurality of vertices, the selected pixel being defined within the triangle by a plurality of barycentric coordinates, the device comprising:

vertex buffer circuitry adapted to receive a set of texture coordinates for each of the vertices of the triangle, the vertex buffer circuitry being configured to determine a plurality of barycentric coefficients for the selected pixel from the texture coordinates of the vertices of the triangle, the barycentric coefficients being optimized to obtain a specified degree of precision, the specified degree of precision being adapted to distinguish between neighboring texture coordinates; and a barycentric evaluator coupled to receive the barycentric coefficients from the vertex buffer circuitry, the barycentric evaluator receiving a plurality of barycentric coordinates associated with the selected pixel, and the barycentric evaluator being configured to compute the texture coordinates based on the barycentric coefficients and the barycentric coordinates, wherein the texture coordinates are substantially distinct from neighboring texture coordinates.

17. The device as recited in claim 16, wherein the vertex buffer circuitry translates the texture coordinates of the vertices of the triangle to optimize the barycentric coordinates into revised texture coordinates such that the texture coordinates fit within a specified number range.

18. The device as recited in claim 16, wherein the vertex buffer circuitry further comprises:

a minimum texture coordinate generator arranged to receive the texture coordinates of the vertices of the triangle, the minimum texture coordinate generator being configured to generate a minimum texture coordinate value from the texture coordinates of the vertices of the triangle; and a plurality of subtractors arranged to receive the texture coordinates of the vertices and the minimum texture coordinate value for generating the barycentric coefficients.

19. The device as recited in claim 18, wherein the minimum texture coordinate generator determines the minimum texture coordinate value by selecting a minimum texture coordinate from the texture coordinates of the vertices of the triangle and determining the minimum texture coordinate value by computing a largest integer value that is equal to or less than the selected minimum texture coordinate.

20. The device as recited in claim 19, wherein the texture coordinates for the vertices of the triangle include C0in, C1in, and C2in, and wherein the barycentric coefficients are (C0in–C2in), (C1in–C2in), and C2in minus the minimum texture coordinate value.

21. The device as recited in claim 20, wherein the barycentric coefficients include A and B, where A and B correspond to areas of sub-triangles defined by the selected pixel and the vertices of the triangle.

22. The device as recited in claim 16, wherein the barycentric evaluator includes an interpolator to interpolate the texture coordinates of the selected pixel based on the barycentric coefficients and the barycentric coordinates.

23. The device as recited in claim 16, wherein the barycentric evaluator computes the texture coordinates of the selected pixel in accordance with a barycentric equation.

24. The method as recited in claim 16, wherein each of the vertices and the selected pixel are associated with texture coordinates (s, t, r) and wherein the vertex buffer circuitry determines the barycentric coefficients for each of the texture coordinates (s, t, r) of the selected pixel.

25. The device as recited in claim 16, wherein the device selects a set of selected pixels within the triangle, wherein the device determines the barycentric coefficients and the texture coordinates of the selected set of pixels in parallel.

* * * * *